United States Patent
Kaneda et al.

(10) Patent No.: US 8,324,296 B2
(45) Date of Patent: Dec. 4, 2012

(54) NON-HALOGEN FLAME-RETARDANT SYNTHETIC RESIN COMPOSITION

(75) Inventors: Takayoshi Kaneda, Saitama (JP); Yuki Endo, Saitama (JP); Tomoyuki Hatanaka, Saitama (JP); Akihiro Yamaki, Saitama (JP); Yohei Harada, Saitama (JP); Mitsuru Fukushima, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/999,190

(22) PCT Filed: Jun. 9, 2009

(86) PCT No.: PCT/JP2009/002593
§ 371 (c)(1),
(2), (4) Date: Dec. 15, 2010

(87) PCT Pub. No.: WO2009/153934
PCT Pub. Date: Dec. 23, 2009

(65) Prior Publication Data
US 2011/0092622 A1  Apr. 21, 2011

(30) Foreign Application Priority Data

Jun. 16, 2008  (JP) ................... 2008-156700
Apr. 3, 2009  (JP) ................... 2009-090685

(51) Int. Cl.
*C08K 5/34* (2006.01)
*C08K 5/52* (2006.01)
(52) U.S. Cl. ........................ 524/100; 524/140
(58) Field of Classification Search .................... 524/100
See application file for complete search history.

(56) References Cited

U.S. PATENT DOCUMENTS

| | | | |
|---|---|---|---|
| 7,465,761 B2 * | 12/2008 | Murase et al. ............... | 524/100 |
| 2003/0088000 A1 | 5/2003 | Kimura et al. | |
| 2004/0225040 A1 | 11/2004 | Hoerold et al. | |
| 2005/0256234 A1 | 11/2005 | Kurumatani et al. | |
| 2006/0047026 A1 * | 3/2006 | Yamada et al. ............... | 524/9 |
| 2010/0174017 A1 * | 7/2010 | Tobita et al. ............... | 524/192 |

FOREIGN PATENT DOCUMENTS

| | | |
|---|---|---|
| EP | 1 277 794 | 1/2003 |
| EP | 1 475 407 | 11/2004 |
| EP | 1 516 907 | 3/2005 |
| EP | 1 719 800 | 11/2006 |
| JP | 2003-26935 A | 1/2003 |
| JP | 2006-348228 A | 12/2006 |
| JP | 2008-115197 A | 5/2008 |
| WO | WO 2004/000973 A1 | 12/2003 |
| WO | WO 2005/080494 A1 | 9/2005 |
| ZA | 2000 2234 | 11/2001 |

OTHER PUBLICATIONS

International Search Report of PCT/JP2009/002593 (Jul. 14, 2009).
Supplementary European Search Report for EP09 76 6382 dated Feb. 10, 2012.

* cited by examiner

*Primary Examiner* — Hui Chin
(74) *Attorney, Agent, or Firm* — Millen, White, Zelano & Branigan, P.C.

(57) ABSTRACT

Described herein is a non-halogen flame-retardant synthetic resin composition which contains the (poly)phosphate compound represented by the following formulae (1) and (3) and layered silicate:

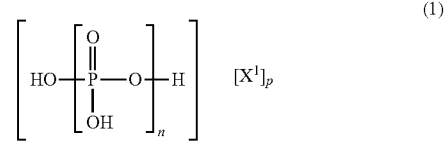

(1)

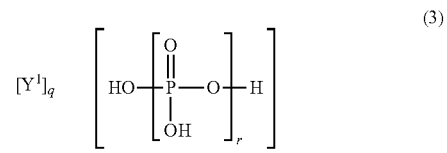

(3)

where $X^1$ is ammonia or a triazine derivative and $Y^1$ is a diamine containing a $[R^1R^2N(CH_2)mNR^3R^4]$ group, piperazine or a diamine containing a piperazine ring.

12 Claims, No Drawings

NON-HALOGEN FLAME-RETARDANT SYNTHETIC RESIN COMPOSITION

FIELD OF THE INVENTION

The present invention relates to a synthetic resin composition having excellent flame retardancy as well as dripping inhibition function when burned, particularly to a flame-retardant synthetic resin composition, which is comprised of a synthetic resin, a special phosphate compound and a layered silicate, but does not contain halogen flame retardants.

BACKGROUND OF THE INVENTION

Synthetic resin, which has not only excellent chemical characteristics but also excellent mechanical characteristics, has been widely used for various fields such as building materials, automobile parts, packing materials, agricultural materials, housing materials for electric appliances and toys. In particular, a polylactic acid resin has a high melting point and can be used for a melt molding, therefore, it is expected as an excellent biodegradable polymer suitable for practical use. In addition it is also expected that it can be used as a polymer for general-use made from bio-raw materials. However, these synthetic resins are flammable substances, therefore, it is essentially required to make them flame-retardant for some applications.

The methods for making these synthetic resins flame-retardant by adding a halogen flame retardant, an inorganic phosphorous flame retardant typified by polyphosphate flame retardants such as red phosphorous and ammonium polyphosphate and an organic phosphorous flame retardant typified by triallyl phosphorous ester compounds, and optionally adding a metallic hydroxide or flame retardant auxiliaries such as an antimony oxide and a melamine compound or the like, alone or in combination are widely known.

However, a halogen flame retardant produces a poisonous gas when burned, which is a problem. Therefore, attempts to use the above phosphorous flame retardant with no such problems have been made. Examples of the attempt such as the flame-retardant synthetic resin compositions which contain an ammonium polyphosphate, a polyhydroxyl-containing compound, a triazine ring-containing compound and a metallic hydroxide (Patent documents 1-5); the flame-retardant synthetic resin compositions which contain melamine polyphosphate and (penta or tripenta) erythritol (Patent documents 6 and 7); the flame-retardant synthetic resin compositions which contain polybutylene terephthalate (PBT), melamine pyrophosphate and aromatic phosphate.oligomer (Patent document 8); and the methods to use melamine pyrophosphate and other phosphorous compounds for polymers such as PBT to make them flame-retardant (Patent documents 9 and 10), have already been known.

Among these methods, intumescent flame retardants have excellent flame retardancy in particular wherein a surface of intumescent layer is formed when burned and flame retardancy is realized by inhibiting diffusion of the decomposition products and heat transmission (Patent document 11).

Further attempts to add an anti-dripping agent to the above intumescent flame retardant have been made in order to inhibit the dripping of resin when burned. It is known that polytetra fluoroethylene (PTFE) is effective as the said anti-dripping agent in particular. However, a fluorinated anti-dripping agent such as PTFE was not a complete non-halogen flame retardant since it has fluorine atoms. Furthermore, using clay mineral or layered mineral as an anti-dripping agent is suggested (Patent documents 12 and 13). However, these did not give any useful knowledge for a flame retardant composition, which is able to form the intumescent layer, wherein not only forming a minute surface of intumescent layer but also inhibiting drip is required.

PRIOR ART DOCUMENTS

Patent Documents

Patent document 1: Japanese Unexamined Patent Publication tokkai-hei 8-176343

Patent document 2: Japanese Unexamined Patent Publication tokkai-hei 8-252823

Patent document 3: Japanese Unexamined Patent Publication tokkai 2008-150560

Patent document 4: Japanese Unexamined Patent Publication tokkai 2004-190025

Patent document 5: Japanese Unexamined Patent Publication tokkai 2004-190026

Patent document 6: U.S. Pat. No. 3,936,416

Patent document 7: U.S. Pat. No. 4,010,137

Patent document 8: Japanese Unexamined Patent Publication tokkai-hei 11-152402

Patent document 9: U.S. Pat. No. 4,278,591

Patent document 10: U.S. Pat. No. 5,618,865

Patent document 11: Japanese Unexamined Patent Publication tokkai 2003-26935

Patent document 12: Japanese Unexamined Patent Publication tokkai 2004-331975

Patent document 13: Japanese Unexamined Patent Publication tokuhyo 2002-504611

SUMMARY OF THE INVENTION

Problems to be Solved by the Invention

Therefore, the first object of the present invention is to provide a non-halogen flame-retardant synthetic resin composition having excellent anti-dripping properties as well as flame retardancy without using halogen flame retardant or fluorinated anti-dripping agent, which produces poisonous gas when burned.

The second object of the present invention is to provide excellent flame-retardant molded articles suitable for electric-electronics associated use or use of automobile parts.

Means to Solve the Problems

The inventors of the present invention have studied extensively in order to achieve the above objects. As a result of this, they have found that a non-halogen flame-retardant synthetic resin composition having excellent anti-dripping properties as well as flame retardancy can be obtained when synthetic resin is mixed with specific (poly) phosphate compounds and also with layered silicate.

Namely, the present invention is a flame-retardant synthetic resin composition characterized by mixing the following components (A), (B) and (C) with synthetic resin.

Component (A): a (poly) phosphate compound represented by the following general formula (1).

Component (B): a (poly) phosphate compound represented by the following general formula (3).
Component (C): layered silicate

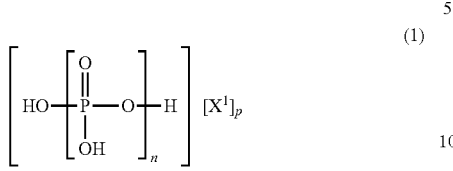

n in the formula (1) is a number of 1~100, $X^1$ is ammonia or a triazine derivative represented by the following general formula (2) and p is a number satisfying a relational expression of $0<p\leq n+2$.

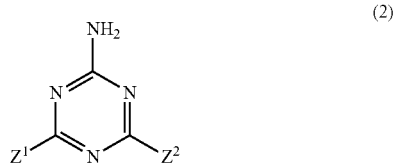

$Z^1$ and $Z^2$ in the formula (2) are groups selected independently from groups consisting of a —$NR^5R^6$ group, a carboxyl group, a mercapto group, a straight chain or branched alkyl group having 1-10 carbon atoms, a straight chain or branched alkoxy group having 1-10 carbon atoms, a phenyl group and a vinyl group, and also the above $R^5$ and $R^6$ are a hydrogen atom, a straight chain or branched alkyl group having 1~6 carbon atoms or a methylol group independently.

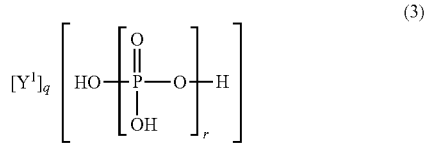

r in the formula (3) is a number of 1~100, $Y^1$ is a diamine containing [$R^1R^2N(CH_2)_mNR^3R^4$], piperazine or a diamine containing a piperazine ring. $R^1$, $R^2$, $R^3$ and $R^4$ are, independently, a hydrogen atom, or a straight chain or branched alkyl group having 1~5 carbon atoms, m is an integer of 1~10, q is a number satisfying a relational expression of $0<q\leq r+2$.

It is preferable in the present invention that the content of the above components (A), (B) and (C) are 0.1-40 mass parts, 0.1-50 mass parts and 0.01-15 mass parts relative to 100 mass parts of synthetic resin in regular order. It is preferable that (A)/(B) of the blending ratio of the components (A) and (B) (based on mass) is 20/80-50/50.

It is preferable in the present invention that 0.01-10 mass parts of zinc oxide is added to 100 mass parts of synthetic resin as the component (D).

It is preferable in the present invention that melamine pyrophosphate is used as the above component (A), which corresponds to the compound of the above general formula (1) wherein n is 2, p is 2 and $X^1$ is melamine and also $Z^1$ and $Z^2$ in the above general formula (2) are —$NH_2$. It is preferable that piperazine polyphosphate is used as the above component (B), which corresponds to the compound of the above general formula (3) wherein q is 1 and $Y^1$ is piperazine. It is preferable in particular that the above piperazine polyphosphate is piperazine pyrophosphate. Furthermore, it is preferable in the present invention that the above component (C) is saponite and/or talc.

Effects of the Invention

The flame-retardant synthetic resin composition of the present invention has excellent flame retardancy and excellent anti-dripping properties, though neither a halogen flame retardant nor a fluorinated anti-dripping agent, which produces poisonous gas when burned, is used.

BEST MODES FOR CARRYING OUT THE INVENTION

Hereafter, the flame-retardant synthetic resin composition of the present invention will be described in detail.

Examples of synthetic resin used in the present invention are α-olefin polymers such as polypropylene, high density polyethylene, low density polyethylene, straight chain low density polyethylene, polybutene and poly-3-methylpentene; or copolymers such as ethylene-vinyl acetate copolymers ethylene-propylene copolymers and copolymers thereof; petroleum resin, coumarone resin, polystyrene, polyvinyl acetate, acrylic resin, copolymers of styrene and/or α-methylstyrene with other monomers (such as maleic anhydride, phenyl maleimide, methyl methacrylate, butadiene and acrylonitrile) (for example, AS resin, ABS resin, MBS resin, heat-resistant ABS resin or the like), straight chain polyesters such as polymethylmethacrylate, polyvinyl alcohol, poly(vinyl formal), polyvinyl butyral, polyethylene terephthalate and polybutyrene terephthalate; polyamides such as polyphenylene oxide, polycaprolactam and polyhexamethylene adipamide; thermoplastic resins and these blends such as polycarbonate, polycarbonate/ABS resin, branched polycarbonate, polyacetal, polyphenylene sulfide, polyurethane and cellulose resin; or biodegradable polylactic acid resin, other than thermosetting resins such as phenol resin, urea resin, melamine resin, epoxy resin and unsaturated polyester resin.

Elastomers such as isoprene rubber, butadiene rubber, acrylonitrile-butadiene copolymer rubber and styrene-butadiene copolymer rubber can be used in the present invention. However, it is not preferable to use halogen-containing resins such as polyvinyl chloride and polyvinylidene chloride since the present invention is a non-halogen flame-retardant synthetic resin composition.

The polyolefin resin, especially polypropylene resin and polyethylene resin among these synthetic resins are difficult in particular to be flame-retardant. However, they can be suitably used for the flame-retardant synthetic resin composition of the present invention as well as polylactic acid resin, which is promised future growth in demand due to its biodegradability.

Depending on density, softening point, insoluble ratio against solvent, degree of stereo-regularity, existence or non-existence of residue of catalyst, types and blending ratio of olefin as a raw material and types of polymerization catalyst (such as Lewis acid catalyst, metallocene catalyst) or the like, the degree of the effect of the present invention differs, however, the present invention is available in all cases.

The above polylactic acid resin used for the present invention represents a polymer of which the major constituents are L-lactic acid and/or D-lactic acid, and may contain other copolymer components other than lactic acid. Examples of the above other copolymer components are glycol compounds such as ethylene glycol, propylene glycol, butandiol, heptandiol, hexandiol, octandiol, nonandiol, decandiol, 1,4-cyclohexandimethanol, neopentyl glycol, glycerin, pentaerythritol, bisphenol A, polyethylene glycol, polypropylene glycol and polytetramethylene glycol; dicarboxylic acids such as oxalic acid, adipic acid, sebacic acid, azelaic acid, dodecanedione acid, malonic acid, glutaric acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenyletherdicarboxylic acid, 5-sodium sulfoisophthalic acid and 5-tetrabutylphosphonium isophthalic acid; hydroxycarboxylic acids such as glycolic acid, hydroxypropionic acid, hydroxybutyric acid, hydroxyvaleric acid, hydroxycaproic acid and hydroxybenzoic acid; lactones such as caprolactone, valerolactone, propiolactone, undecalactone and 1,5-oxepan-2-one. It is preferable that the content of such other copolymer components is 0-30 mol %, in particular 0-10 mol % relative to all monomer components.

The molar ratio (L/D) of L-lactic acid unit and D-lactic acid unit in the part of the above polylactic acid of the present invention can be set as appropriate. The said molar ratio is not limited in particular. Generally, it is preferable that any of L-lactic acid unit or D-lactic acid unit is 75 mol % or more to obtain a polylactic acid resin composition having a high melting point and any of L-lactic acid unit or D-lactic acid unit is 90 mol % or more to obtain a polylactic acid resin composition having a much more higher melting point.

In some cases, it is also preferable that polylactic acid comprising 80% or more of L substance and polylactic acid comprising 80% or more of D substance are used together. It is more preferable that polylactic acid comprising 90% or more of L substance and polylactic acid comprising 90% or more of D substance are used together.

Modified polylactic acid resin may be used in the present invention. Examples of modified polylactic acid resin are maleic anhydride modified polylactic acid resin, epoxy modified polylactic acid resin, amine modified polylactic acid resin or the like. Mechanical characteristics as well as thermal resistance can be improved by using these modified polylactic acid resin. Therefore, this is one of preferable embodiments of the present invention.

The polylactic acid resin used in the present invention can be manufactured using known methods of polymerization such as a direct polymerization method with lactic acid, and a ring-opening polymerization through lactide. The molecular weight and molecular weight distribution of polylactic acid resin used in the present invention are not particularly limited provided that the molding process can be carried out substantially. Usually polystyrene having reduced weight average molecular weight (MW) measured by gel permeation chromatographic analysis is 10,000-500,000. If the above weight average molecular weight is less than 10,000, it is difficult to obtain physical properties necessary for practical use, whereas if it is more than 500,000, molding properties tend to deteriorate. Therefore, it is preferably 40,000-500,000, in particular 100,000-250,000.

The melting point of polylactic acid resin used in the present invention is not particularly limited. 120° C. or more is preferable, 150° C. or more is particularly preferable. The melting point of polylactic acid tends to be higher as optical purity increases. Therefore, it is preferable to use polylactic acid having high optical purity in order to obtain the above polylactic acid resin having a high melting point.

In the flame-retardant synthetic resin composition of the present invention, the polyphosphate compound used as component (A), which is represented by the afore-mentioned general formula (1), is a salt combined with phosphoric acid and ammonia or with a triazine derivative represented by the afore-mentioned general formula (2).

Examples of a straight chain or branched alkyl group having 1-10 carbon atoms represented by $Z^1$ and $Z^2$ in the afore-mentioned general formula (2) are methyl, ethyl, propyl, isopropyl, butyl, secondary butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl and decyl. Examples of a straight chain or branched alkoxy group having 1-10 carbon atoms are groups derived from these alkyl groups.

Examples of a straight chain or branched alkyl group having 1-6 carbon atoms corresponding to $R^5$ or $R^6$ in the $-NR^5R^6$ group, which may be $Z^1$ or $Z^2$, can be alkyl groups having 1-6 carbon atoms among the above alkyl groups.

Specific examples of the afore-mentioned triazine derivative are melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine and 2-amino-4,6-dimercapto-1,3,5-triazine.

An example of compounds used as the component (A) among the (poly)phosphate compounds represented by the afore-mentioned general formula (1) is a salt of phosphoric acid with melamine, or a polyphosphate ammonium compound. Particularly in the present invention, the salt of phosphoric acid with melamine is preferably used.

Examples of the salt of phosphoric acid and melamine are melamine orthophosphate, melamine pyrophosphate and melamine polyphosphate. In the present invention, it is preferable in particular to use melamine pyrophosphate among these, which corresponds to a compound represented by the afore-mentioned general formula (1) wherein n is 2, p is 2 and $X^1$ is melamine. The salts of phosphoric acid and melamine can be obtained as follows; for example, as for melamine pyrophosphate, after blending sodium pyrophosphate and melamine at the suitable reaction ratio, hydrochloric acid is added to react and neutralization is carried out by sodium hydroxide.

The above ammonium polyphosphate compound is ammonium polyphosphate single substance or a compound whose main component is ammonium polyphosphate. Examples of commercial products of the said ammonium polyphosphate single substance are Exolit-422 and Exolit-700 (Commercial names: manufactured by Clariant International Ltd.), Phos-chek-P/30 and Phos-chek-P/40 (Commercial names: manufactured by Monsant Company), SUMISAFE-P (Commercial name: manufactured by Sumitomo Chemical Co., Ltd.), and TERRAJU-S10 and TERRAJU-S20 (Trademarks: manufactured by CHISSO CORPORATION).

Compounds having the above ammonium polyphosphate as a main component are as follows: the one wherein the ammonium polyphosphate is coated or microencapsulated with thermosetting resin, the one wherein the surface of the ammonium polyphosphate is coated with a melamine monomer or other nitrogen-containing organic compounds, the one treated with surfactant and a silicone compound or the one wherein melamines are added in the process of manufacturing ammonium polyphosphate in order to make the ammonium polyphosphate insoluble. Examples of commercial articles are Exolit-462 (Commercial name: manufactured by Clariant International Ltd.), SUMISAFE-PM (Commercial name: manufactured by Sumitomo Chemical Co., Ltd.), TERRAJU-C60, TERRAJU-C70 and TERRAJU-C80 (Trademarks: manufactured by CHISSO CORPORATION).

A (poly) phosphate compound, which is used as the component (B) in the flame-retardant synthetic resin composition of the present invention, represented by the afore-mentioned general formula (3) is a salt of (poly)phosphoric acid and diamine represented by $Y^1$. The diamine represented by $Y^1$ is a diamine which contains $R^1R^2N(CH_2)mNR^3R^4$, piperazine or a piperazine ring. Herein, $R^1$, $R^2$, $R^3$ and $R^9$ are each hydrogen atom, or a straight chain or branched alkyl group having 1-5 carbon atoms. $R^1$, $R^2$, $R^3$ and $R^4$ may be an identical group or different groups. Examples of a straight chain or branched alkyl group having 1-5 carbon atoms represented by the above $R^1$, $R^2$, $R^3$ and $R^4$ include groups having 1-5 carbon atoms among groups cited in specific examples of an alkyl group represented by the afore-mentioned $Z^1$ and $Z^2$.

Examples of diamine represented by $Y^1$ in the afore-mentioned general formula (3) are N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine and 1,4-bis(3-aminopropyl)piperazine. Commercial products are all applicable for these compounds.

Examples of compounds suitable to use as the component (B) are salts of phosphoric acid and piperazine such as piperazine orthophosphate, piperazine pyrophosphate and piperazine polyphosphate among (poly)phosphate compounds represented by the afore-mentioned general formula (3). In the present invention, it is preferable to use piperazine polyphosphate, which corresponds to a compound represented by the afore-mentioned general formula (3) wherein q is 1 and $Y^1$ is piperazine, among these. It is preferable in particular to use piperazine pyrophosphate.

The salt of phosphoric acid and piperazine, for example, piperazine pyrophosphate can be obtained easily as a precipitate having low-water solubility by reacting piperazine and pyrophosphoric acid in water or methanol water solution.

A salt obtained from polyphosphoric acid, consisting of orthophosphoric acid, pyrophosphoric acid, tripolyphosphoric acid and other polyphosphate mixture, and piperazine may be used when piperazine (poly) phosphate is used in the present invention. In this case, the composition of polyphosphoric acid used as raw material is not limited in particular.

It is preferable that the blending amount of the above component (A) is 0.1~40 mass parts relative to 100 mass parts of synthetic resin. 1~30 mass parts is more preferable, in particular 5~30 mass parts is optimal.

It is preferable that the blending amount of the above component (B) is 0.1~50 mass parts relative to 100 mass parts of synthetic resin. 1~40 mass parts is more preferable, in particular 5~40 mass parts is optimal.

It is preferable that the total blending amount of the above components (A) and (B) as the flame retardant components is 1~90 mass parts relative to 100 mass parts of synthetic resin component. 5~70 mass parts is more preferable, in particular 10~70 mass parts is optimal. If it is less than 1 mass part, sufficient flame-retardant properties can not be obtained. If it is more than 90 mass parts, the qualities as resin decrease, which is not preferable.

It is preferable that (A)/(B) (mass standard) of the blending ratio of the above components (A) and (B) is 20/80~50/50, in particular 30/70~50/50 is more preferable from a flame-retardant standpoint.

The component (C) used in the present invention is natural or synthetic layered silicate, which is used to impart flame retardancy to flame-retardant polylactic resin composition of the present invention by inhibiting dripping when burned. The layered silicate is a layered silicate mineral and may have cation between layers.

The cation existing between layers of these layered silicate means the one existing on the surface of crystal of the layered silicate. These cations may be metallic ion or cations other than metallic ions, a part or all of which are organic cation, (quaternary) ammonium cation and phosphonium cation. These layered silicates may be used alone or two or more kinds of them may be used together.

Examples of the above metallic ion are sodium ion, potassium ion, calcium ion, magnesium ion, lithium ion, nickel ion, copper ion and zinc ion. Examples of organic cation or quaternary ammonium cation are lauryltrimethylammonium cation, stearytrimethylammonium cation, trioctylmethylammonium cation, distearyldimethylammonium cation, dicured beef tallow dimethylammonium cation and distearyldibenzyl ammonium cation. These quaternary ammonium cations may be used alone or two or more kinds of them may be used together.

Metallic ion has cation-exchanging properties between cationic substances. Therefore, various cationic substances other than metallid ion such as organic cation, (quaternary) ammonium cation and phosphonium cation can be inserted (Intercalate) between crystal layers of layered silicate.

The layered silicates used in the present invention are not limited in particular. Examples are smectite clay minerals such as montmorillonite, saponite, hectorite, beidellite, stevensite and nontronite; vermiculite, halloysite, swelling mica and talc. It is preferable to use saponite or talc among these from a drip inhibiting standpoint. It is preferable to use talc in particular from an economical standpoint such as cost.

An example of the saponite in the above layered silicate is Sumecton SA (manufactured by KUNIMINE INDUSTRIES CO., LTD). Examples of montmorillonite are S-BEN (manufactured by HOJUN CO., LTD), S-BEN E (manufactured by HOJUN CO., LTD), S-BEN N-400 (manufactured by HOJUN CO., LTD) and S-BEN NO12 (manufactured by HOJUN CO., LTD). Examples of talc are MICRO TALC MAICRO ACE Series manufactured by NIPPON TALC CO., LTD such as MAICRO ACE P-4, NANO TALC SG Series manufactured by NIPPON TALC CO., LTD and NANO Ace Series manufactured by NIPPON TALC CO., LTD.

The layered silicates in the present invention may be natural or synthetic.

It is preferable that the blending ratio of the layered silicate of the component (C) used in the present invention is 0.01-15 mass parts relative to 100 mass parts of synthetic resin. 0.1-12 mass parts is more preferable. When the blending amount is less than 0.01 mass parts, a drip inhibiting effect is poor. When it is more than 15 mass parts, uniformity and resin characteristics may decrease.

It is preferable that zinc oxide is added in the flame-retardant synthetic resin composition of the present invention as the further component (D). The above zinc oxide may be surface-treated. Commercial products such as Zinc Oxide Grade 1 (manufactured by MITSUI MINING & SMELTING CO., LTD), partially coated type Zinc Oxide (manufactured by MITSUI MINING & SMELTING CO., LTD), NANO FINE 50 (ultrafine particle zinc oxide with average particle size of 0.02 μm: manufactured by SAKAI CHEMICAL INDUSTRY CO., LTD) and NANO FINE K (ultrafine particle zinc oxide coated with zinc silicate of average particle size of 0.02 μm: manufactured by SAKAI CHEMICAL INDUSTRY CO., LTD) can be used as the zinc oxide which the present invention uses. It is preferable that the blending ratio of zinc oxide as the component (D) is 0.01-10 mass parts relative to 100 mass parts of synthetic resin from flame-retardant and anti-dripping standpoints. 0.1-5 mass parts is more preferable.

Furthermore, in the present invention, it is preferable to contain polycarbodiimide as the further component (E) from a water resistant standpoint when polylactic resin is used as synthetic resin. The above carbodiimide is a (co)polymer using at least one kind of polyisocyanate selected from the following polyisocyanate compounds. Specific examples of the above polyisocyanate are hexamethylenediisocyanate, xylenediisocyanate, cyclohexanediisocyanate, pyridinediisocyanate, 2,4-trilenediisocyanate, 2,6-trilenediisocyanate, 4,4-diphenylmethanediisocyanate, p-phenylenediisocyanate, m-phenylenediisocyanate and 1,5-naphthylenediisocyanate.

As the polycarbodiimide of the above component (E), CARBODILITE HMV-8CA and CARBODILITE LA-1 (manufactured by Nisshinbo Chemical Inc.) in particular are preferable from a water resistant standpoint.

It is preferable that the blending ratio of the above component (E) in the present invention is 0.01-10 mass parts relative to 100 mass parts of polylactic acid resin from a water resistant standpoint. 0.1-5 mass parts is preferable in particular. 0.5-3 mass parts is optimal. If it is less than 0.01 mass parts, water resistance could be insufficient. If it is more than 10 mass parts, resin characteristics may decrease.

When a polylactic acid resin is used as a synthetic resin in the present invention, resins other than a polylactic acid resin may be further blended. These resins other than a polylactic acid resin may be used alone or two or more kinds of them may be used together in the present invention. These resins may be used alone or in combination. Either of thermoplastic resin or thermosetting resin may be used as a resin other than the above polylactic acid resin. However, thermoplastic resin is preferably used from a viewpoint of formability. When a resin other than a polylactic acid resin is blended in the present invention, the blending amount is preferably 0~120 mass parts relative to 100 mass parts of polylactic acid resin.

Specific examples of resins other than the said polylactic acid resin are polyolefin resins such as low-density polyethylene resin, high-density polyethylene resin and polypropylene resin; polyester resin, polyamide resin, polystylene resin, polyacetal resin, polyurethane resin, aromatic and aliphatic polyketone resin, polyphenylene sulfide resin, polyether ether ketone resin, polyimide resin thermoplastic starch resin, acrylic resin, AS resin, ABS resin, AES resin, ACS resin, AAS resin, polyvinyl chloride resin, polyvinylidene chloride resin, vinylester resin, MS resin, polycarbonate resin, polyarylate resin, polysulfone resin, polyethersulfone resin, phenoxy resin, polyphenylene oxide resin, poly-4-methylpentene-1, polyetherimide resin, cellulose acetate resin, polyvinyl alcohol resin, unsaturated polyester resin, melamine resin, phenol resin and urea resin.

Further, other examples of resins other than polylactic acid resins are ethylene-propylene copolymer, ethylene-propylene-nonconjugated diene copolymer, ethylene-butene-1 copolymer, various types of acrylic rubber, ethylene-acrylic acid copolymer and its alkali metal salt (namely, ionomer), ethylene-glycidyl(meth)acrylate copolymer, ethylene-acrylic acid alkylester copolymer (such as ethylene-ethyl acrylate copolymer and ethylene-butyl acrylate copolymer), acid modified ethylene-propylene copolymer, diene rubber (such as polybutadiene, polyisoprene and polychloroprene), copolymer of diene and vinyl monomer (such as styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, polybutadiene graft-copolymerised by styrene, and butadiene-acrylonitrile copolymer), polyisobutylene, copolymer of isobutylene and butadiene or isoprene, natural rubber, thiol rubber, polysulfide rubber, acrylic rubber, polyurethane rubber, polyether rubber and epichlorohydrin rubber. In the present invention, furthermore, copolymers having various crosslinking degrees, various microstructures such as cis structure and trans structure, and vinyl groups, or having various average particle sizes (in a resin composition), and multilayer-structured polymer of so-called core shell rubber which is composed of a core layer and one or more shell layer covering the core layer wherein adjacent layers are composed of different kinds of polymer can be used. In addition, core shell rubber containing silicone compound can also be used. Each (co)polymer cited in the above specific examples may be any of random copolymer, block copolymer and graft copolymer.

From a standpoint of high improvement effects on resin characteristics, in particular among the above resins, polyester resin, polyamide resin, polystyrene resin, polyurethane resin, aromatic polyketone resin, polyphenylene sulfide resin, polyether ether ketone resin, polyvinyl chloride resin, polyvinylidene chloride resin, polycarbonate resin, AS resin, ABS resin, polyarylate resin, polysulfone resin, polyether sulfone resin, phenoxy resin, polyphenylene oxide resin, polyetherimide resin, polyacetal resin, unsaturated polyester resin, urea resin, thiol rubber and silicone compound-containing core shell rubber can be preferably used in the present invention. Among them, polyester resin, polycarbonate resin, phenoxy resin, polyamide resin, polyetherimide resin, AS resin, polyacetal resin, silicone compound-containing core shell rubber are preferably used. Polyester resin, polycarbonate resin, polyamide resin, AS resin, polyacetal resin, and silicone compound-containing core shell rubber are Optimally used in the present invention.

The above additional polyester resins are polymer or copolymer obtained by polycondensation reaction of at least one kind of compound selected from the following (a)-(c) and these are thermoplastic polyester resins other than polylactic acid resin.
(a) dicarboxylic acid or its ester-formable derivative and diol or its ester-formable derivative
(b) hydroxycarboxylic acid or its ester-formable derivative
(c) lactone Examples of the above dicarboxylic acid or its ester-formable derivative are aromatic dicarboxylic acids such as terephtalic acid, isophthalic acid, phtalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, 5-tetrabutylphosphoniumisophthalic acid and 5-sodiumsulfoisophthalic acid; aliphatic dicarboxylic acids such as oxalic acid, succinic acid, adipic acid, sebacic acid, azelaic acid, dodecanedione acid, malonic acid, glutaric acid and dimer acid; alicyclic dicarboxylic acid units such as 1,3-cyclohexanedicarboxylic acid and 1,4-cyclohexanedicarboxylic acid, and these ester-formable derivatives.

Furthermore, examples of the above diol or its ester-formable derivative are aliphatic glycols having 2-20 carbon numbers, namely ethylene glycol, propylene glycol, 1,4-butanediol, neopentyl glycol, 1,5-pentanediol, 1,6-hexanediol, decamethylene glycol, cyclohexanedimethanol, cyclohexanediol and dimerdiol; or long-chain glycols having 200~100,000 molecular weights, namely polyethylene glycol, poly-1,3-propylene glycol and polytetramethylene glycol; aromatic dioxy compounds, namely 4,4'-dihydroxy biphenyl, hydroquinone, t-butylhydroquinone, bisphenol A, bisphenol Sand bisphenol F; and these ester-formable derivatives.

Examples of the above hydroxycarboxylic acid are glycolic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid and these ester-formable derivatives. In addition, examples of the above lactone are caprolactone, valerolactone, propiolactone, undecalactone and 1,5-oxepan-2-one.

Specific examples of these polymers or copolymers are aromatic polyesters such as polybutylene terephthalate, polybutylene (terephthalate/isophthalate), polypropylene terephthalate, polypropylene (terephthalate/isophthalate), polyethylene terephthalate, polyethylene (terephthalate/isophthalate), bisphenol A (terephthalate/isophthalate), polybutylene naphthalate, polybutylene (terephthalate/naphthalate), polypropylene naphthalate, polypropylene (terephthalate/naphthalate), polyethylene naphthalate, polycyclohexanedimethylene terephthalate, polycyclohexanedimethylene (terephthalate/isophthalate), poly(cyclohexanedimethylene/ethylene)terephthalate, poly(cyclohexanedimethylene/ethylene) (terephthalate/isophthalate), polybutylene(terephthalate/isophthalate)/bisphenol A and polyethylene(terephthalate/isophthalate)/bisphenol A; copolymers wherein an aromatic polyester is copolymerized with an aromatic polyester or polyether such as polybutylene terephthalate/succinate), polypropylene(terephthalate/succinate), polyethylene (terephthalate/succinate), polybutylene (terephthalate/adipate), polypropylene(terephthalate/adipate), polyethylene(terephthalate/adipate), polyethylene (terephthalate/sulfoisophthalate/adipate), polyethylene (terephthalate/sulfoisophthalate/succinate), polypropylene (terephthalate/sulfoisophthalate/succinate), polybutylene (terephthalate/sebacate), polypropylene(terephthalate/sebacate), polyethylene(terephthalate/sebacate), polybutylene terephthalate.polyethylene glycol, polypropylene terephthalate.polyethylene glycol, polyethylene terephthalate.polyethylene glycol, polybutylene terephthalate.poly(tetramethylene oxide)glycol, polypropylene terephthalate.poly(tetramethylene oxide)glycol, polybutylene (terephthalate/isophthalate).poly(tetramethylene oxide)glycol, polypropylene(terephthalate/isophthalate).poly(tetramethylene oxide)glycol, polybutylene terephthalate.poly(propylene oxide/ethylene oxide)glycol, polypropylene terephthalate poly(propylene oxide/ethylene oxide)glycol, polybutylene (terephthalate/isophthalate).poly(propylene oxide/ethylene oxide)glycol, polypropylene(terephthalate/isophthalate).poly(propylene oxide/ethylene oxide)glycol, polybutylene (terephthalate/adipate), polypropylene(terephthalate/adipate) and polybutylene terephthalate.poly-ϵ-caprolactone; polyhydroxyalkanoate such as copolymer of β-hydroxy valeric acid with polyethylene oxalate, polypropylene oxalate, polybutylene oxalate, polyneopentyl glycol oxalate, polyethylene succinate, polypropylene succinate, polybutylene succinate, polybutylene adipate, polypropylene adipate, polyethylene adipate, polybutylene (succinate/adipate), polypropylene (succinate/adipate), polyethylene (succinate/adipate), polyhydroxy butyrate and β-hydroxy butyrate; aliphatic polyester such as polycaprolactone, polyglycol acid; aliphatic polyestercarbonate such as polybutylenesuccinate.carbonate; liquid crystalline polyesters like copolymer polyesters such as p-oxybenzoic acid/polyethylene terephthalate, p-oxybenzoic acid/6-oxy-2-naphthoic acid.

Among them, it is preferable in the present invention to use a polymer obtained by polycondensation reaction wherein main components of aromatic dicarboxylic acid or its ester-formable derivative reacts with main components of aliphatic diol or its ester-formable derivative. Specific examples are polybutylene terephthalate, polypropylene terephthalate, polyethylene terephthalate, poly(cyclohexanedimethylene/ethylene) terephthalate, polypropylene naphthalate, polybutylene naphthalate, polybutylene (terephthalate/isophthalate), polypropylene (terephthalate/isophthalate), polyethylene (terephthalate/isophthalate), polybutyleneterephthalate.polyethyleneglycol, polypropylene terephthalate.polyethylene glycol, polyethylene terephthalate.polyethylene glycol, polybutylene terephthalate.poly(tetramethylene oxide)glycol, polypropylene terephthalate.poly(tetramethylene oxide)glycol, polyethylene terephthalate.poly(tetramethylene oxide)glycol, polybutylene(terephthalate/isophthalate) poly(tetramethylene oxide) glycol, polypropylene(terephthalate/isophthalate) poly(tetramethylene oxide) glycol, polybutylene (terephthalate/adipate), polypropylene (terephthalate/adipate), polyethylene (terephthalate/adipate), polybutylene (terephthalate/succinate), polypropylene (terephthalate/succinate) and polyethylene (terephthalate/succinate).

It is more preferable in the present invention that the ratio of the aromatic dicarboxylic acid or its ester-formable derivative relative to the entire dicarboxylic acid is 30 mol % or more in the polymer wherein the above aromatic dicarboxylic acid or its ester-formable derivative and the aliphatic diol or its ester-formable derivative are polycondensed as major components. 40 mol % or more is particularly desirable.

It is more preferable among these to use a polymer wherein terephthalic acid or its ester-formable derivative and aliphatic diol or its ester-formable derivative selected from ethylene glycol, propylene glycol and butanediol are polycondensed as major components.

Specific examples are polypropylene terephthalate, polybutylene terephthalate, polybutylene (terephthalate/isophthalate), polypropylene(terephthalate/isophthalate), polyethylene terephthalate.polyethylene glycol, polypropylene terephthalate.polyethylene glycol, polybutylene terephthalate.polyethylene glycol, polyethylene terephthalate.poly(tetramethylene oxide)glycol, polypropylene terephthalate.poly(tetramethylene oxide)glycol, polybutylene terephthalate.poly(tetramethylene oxide)glycol, polyethylene terephthalate/isophthalate.poly(tetramethylene oxide)glycol, polypropylene (terephthalate/isophthalate).poly(tetramethylene oxide)glycol, polybutylene(terephthalate/isophthalate) poly(tetramethylene oxide)glycol, polyethylene(terephthalate/succinate), polyethylene(terephthalate/adipate), polypropylene (terephthalate/succinate), polypropylene (terephthalate/adipate), polybutylene(terephthalate/succinate) and polybutylene(terephthalate/adipate).

It is more preferable in the present invention that the ratio of the terephtharic acid or its ester-formable derivative relative to the entire dicarboxylic acid is 30 mol % or more in the polymer wherein the above terephtharic acid or its ester-formable, derivative and the butanediol or its ester-formable derivative are polycondensed as major components. 40 mol % or more is more desirable.

In addition, preferable examples of the polyester resin used for the present invention are polybutylene succinate, polyester carbonate and polyhydroxyalkanoate. These polyester resins may be used alone or two or more kinds of them may be used by mixture.

Preferable examples of the above polyester resins are polyethylene terephthalate, polybutylene terephthalate, polybutylene(terephthalate/isophthalate), polybutylene(terephthalate/adipate), polyethylene(terephthalate/succinate), polybutylene(terephthalate/succinate), polyester elastomer, polypropylene terephthalate, polybutylene terephthalate-.poly(tetramethylene oxide)glycol and polybutylene succinate. Particularly preferable example is at least one kind selected from polybutylene terephthalate, polypropylene terephthalate, polybutylene terephthalate.poly(tetramethylene oxide)glycol, polyethylene(terephthalate/succinate) and polybutylene succinate.

Additional polyamide resins in the present invention are thermoplastic polymers having amide bond wherein amino acid, lactam or diamine and dicarboxylic acid are starting materials. Examples of the above amino acid are 6-aminocaproic acid, 11-aminoundecanoic acid, 12-aminododecanoic acid and para-aminomethylbenzoic acid. Examples of the above lactam are ε-caprolactam and ω-laulolactam.

Examples of the above diamine are tetramethylenediamine, hexamethylenediamine, undecamethylenediamine, dodecamethylenediamine, 2,2,4-trimethyl hexamethylenediamine, 2,4,4-trimethyl hexamethylenediamine, 5-methylnonamethylenediamine, 2,4-dimethyloctamethylenediamine, meta-xylylenediamine, para-xylylenediamine, 1,3-bis(aminomethyl)cyclohexane, 1-amino-3-aminomethyl-3,5,5-trimethylcyclohexane, 3,8-bis(aminomethyl) tricyclodecane, bis(4-aminocyclohexyl)methane, bis(3-methyl-4-aminocyclohexyl)methane, 2,2-bis(4-aminocyclohexyl)propane, bis(aminopropyl)piperazine and aminoethyl piperazine.

Examples of the above dicarboxylic acid are adipic acid, suberic acid, azelaic acid, sebacic acid, dodecanedioic acid, terephthalic acid, isophthalic acid, naphthalenedicarboxylic acid, 2-chloroterephthalic acid, 2-methylterephthalic acid, 5-methylisophthalic acid, 5-sodiumsulfoisophthalic acid, hexahydroterephthalic acid, hexahydroisophthalic acid and diglycollic acid.

Preferable examples of polyamide used in the present invention are copolymerized polyamide, mixed polyamide, polyamide elastomer such as polycaproamide (nylon 6), polytetramethylene adipamide (nylon 46), polyhexamethyleneadipamide (nylon 66), polyhexamethylen sebacamide (nylon 6/10), polyhexamethylene dodecamide (nylon 6/12), polyundecamethylene adipamide (nylon 11/6), polyundecaneamide (nylon 11), polydodecaneamide (nylon 12), polytrimethylhexamethyleneterephthalamide, polyhexamethyleneisophthalamide (nylon 6I), polyhexamethyleneterephthal/isophthalamide (nylon 6T/6I), polybis(4-aminocyclohexyl)methanedodecamide (nylon PACM 12), polybis(3-methyl-4-aminocyclohexyl)methanedodecamide (nylondimethyl PACM 12), polymetaxylyleneadipamide (nylon MXD 6), polyundecamethyleneterephthalamide (nylon 11T) and polyundecamethylenehexahydroterephthalamide (nylon 11T (H)); and copolymer of the above polymers with polyalkylene glycol etc. It is preferable in the present invention to use nylon 6, nylon 66, nylon 11, nylon 12, nylon 6/10, nylon 6/12 and nylon 11/6; copolymerized polyamide of these and polyethylene glycol or the like, mixed polyamide or polyamide elastomer. It is more preferable to use nylon 6, nylon 11, nylon 12, nylon 6/polyethylene glycol copolymer or polyamide elastomer. It is particularly preferable to use nylon 6 or nylon 6/polyethylene glycol copolymer.

Furthermore, from a thermostable viewpoint of polylactic acid resin, it is preferable that the melting point of polyamide resin used for the present invention is between 90° C. and 240° C. Particularly the optimal temperature is between 100° C. and 230° C. The above polyamide resins may be used alone or two or more kinds of them may be used by mixture.

Examples of the above additional polycarbonate resin available for the present invention are aromatic polycarbonates such as aromatic homopolycarbonate or copolycarbonate obtained by reacting aromatic dihydric phenol compound with phosgene or diester carbonate.

Examples of the above aromatic dihydric phenol compound are 2,2-bis(4-hydroxyphenyl)propane, 2,2-bis(4-hydroxy-3,5-dimethylphenyl)propane, bis(4-hydroxyphenyl) methane, 1,1-bis(4-hydroxyphenyl)ethane, 2,2-bis(4-hydroxyphenyl)butane, 2,2-bis(4-hydroxy-3,5-diphenyl) butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane and 1-phenyl-1,1-bis (hydroxyphenyl)ethane. These compounds can be used alone or as mixtures.

The above additional AS resin is a copolymer consisting of stylene and acrylonitrile as major components and may be copolymerized with aromatic vinyl compounds such as α-methyl stylene, vinyl toluene and divinyl benzene; a vinyl cyanide compound such as methacrylonitrile; (meth)acrylic acid alkyl esters such as methyl methacrylate, ethyl methacrylate, n-butyl methacrylate, methyl acrylate, ethyl acrylate, n-butyl acrylate and stearyl acrylate; maleimide monomers such as maleimide, N-methyl maleimide, N-ethyl maleimide, N-phenyl maleimide and N-cyclohexyl maleimide; a diene compound, maleic acid dialkyl ester, allyl alkylether, an unsaturated amino compound and vinyl alkylether etc.

It is preferable that examples of AS resin used for the present invention are those which are further graft polymerized or copolymerized with unsaturated monocarboxylic acids, unsaturated dicarboxylic acids, unsaturated acid anhydride or epoxy group-containing vinyl monomer. AS resins, which are graft polymerized or copolymerized with unsaturated acid anhydride or epoxy group-containing vinyl monomer may also be available.

Such an epoxy group-containing vinyl monomers is a compound having both a radical-polymerizable vinyl group and an epoxy group within a molecule. Specific examples are glycidyl esters of unsaturated organic acid such as glycidyl acrylate, glycidyl metacrylate, glycidyl ethacrylate and glycidyl itaconate; glycidyl ethers such as allyl glycidylether; and monomeric derivatives used for the above AS resin such as 2-methylglycidyl metacrylate. It is preferable in the present invention to use glycidyl acrylate and glycidyl metacrylate among them. They can be used alone or two or more kinds of them can be used in combination. The above unsaturated acid anhydrides are compounds having both a radical polymerizable vinyl group and an acid anhydride within a molecule. A preferably specific example is maleic anhydride etc.

The above additional polyacetal resin is a polymer wherein an oxymethylene unit is a main repeating unit. It may be (1) a so-called polyacetal homopolymer obtained by polymerization reaction wherein a main raw material is formaldehyde or trioxane, (2) a so-called polyacetal copolymer consisting mainly of an oxymethylene unit, and containing 15 weight % or less of oxyalkylene unit having 2-8 adjacent carbon atoms within a main chain, or (3) any of the block copolymers, terpolymers and cross-linked polymers which are copolymers having other constitution units. They can be used alone or two or more types of them can be used together in the present invention.

In addition, a preferable example of silicone compound-containing core shell rubber used for the present invention is a silicone.acrylic composite core shell rubber.

In manufacturing a flame-retardant synthetic resin composition of the present invention, the timing of mixing a synthetic resin composition with components (A)-(C), and furthermore component (D) if necessary is not limited in particular. For example, two or more kinds of them selected from components (A)-(D) may be packaged to one in advance to mix a synthetic resin or each component may be mixed with a synthetic resin respectively.

In packaging to one, each component may be crashed preliminarily to mix or mixed preliminarily to crash.

The present invention is a non-halogen flame-retardant synthetic resin composition. Therefore, it is undesirable to use fluorinated resins etc. or fluorinated anti-dripping agents such as alkaline metal salts or alkaline earth metal salts of perfluoroalkane sulfonic acid. However, fluorinated anti-dripping agents may be added in certain area or usage as long as problems do not occur with the use of them.

On the other hand, it is possible to use silicone rubbers, which do not contain halogen atoms, as other anti-dripping agents.

Specific examples of fluorinated anti-dripping agents available for the present invention are fluorinated resins such as polytetrafluoroethylene, polyvinylidene fluoride and polyhexafluoropropylene; perfluoroalkanesulfonic acid alkali metal salt compounds such as perfluoromethanesulfonic acid sodium salt, perfluoro-n-butanesulfonic acid potassium salt, perfluoro-t-butanesulfonic acid potassium salt, perfluorooctanesulfonic acid sodium salt and perfluoro-2-ethylhexanesulfonic acid calcium salt; or perfluoroalkanesulfonic acid alkaline earth metal salt. These fluorinated anti-dripping agents may be used alone or two or more kinds of them can be used by mixture in the present invention.

Silicone oil may be blended with the flame-retardant synthetic resin composition of the present invention in order to inhibit secondary aggregation and improve water resistance when blended. Silicone oils having methylpolysiloxane structure include oils having dimethylpolysiloxane structure alone, both dimethylpolysiloxane and methylhydrogenpolysiloxane structures, and methylhydrogenpolysiloxane structure alone. Epoxy modified, carboxyl modified, carbinol modified and/or amino modified silicone oils may also be used.

An example of silicone oil consisting of 100% methylhydrogen structure is KF-99 (manufactured by Shin-Etsu Chemical Co., Ltd.). Examples of silicone oil partially consisting of methylhydrogen structure are HMS-151 (manufactured by Gelest Inc.), HMS-071 (manufactured by Gelest Inc.), HMS-301 (manufactured by Gelest Inc.) and DMS-H21 (manufactured by Gelest Inc.). Examples of epoxy-modified articles are X-22-2000 (manufactured by Shin-Etsu Chemical Co., Ltd.) and KF-102 (manufactured by Shin-Etsu Chemical Co., Ltd.). An example of a carboxyl-modified article is X-22-4015 (manufactured by Shin-Etsu Chemical Co., Ltd.). An example of a carbinol-modified article is X-22-4015 (manufactured by Shin-Etsu Chemical Co., Ltd.). An example of amino-modified article is KF-393 (manufactured by Shin-Etsu Chemical Co., Ltd.).

A silane coupling agent may be further added to the flame-retardant resin composition of the present invention. In this case, it is preferable to use a polylactic acid resin as a synthetic resin in particular. A silane coupling agent, which is represented by $A\text{-}(CH_2)_K\text{—}Si(OR)_3$, is a compound having an organic functional group and a hydrolysable silyl group. A is an organic group, K represents a number of 1-3, R represents a methyl group or ethyl group. Organic groups of A include an epoxy group, a vinyl group, a methacrylic group, an amino group and a mercapto group. A silane-coupling agent having an epoxy group is most desirable for the present invention in particular.

Furthermore, the flame-retardant resin composition of the present invention can contain a reinforcing agent. This embodiment is desirable when a polylactic acid resin is used as a synthetic resin in particular. Fibrous, plate-like, granular and powdery reinforcing agents used generally for reinforcing thermoplastic resin can be used as reinforcing agents available in the present invention. Specific examples of reinforcing agents are inorganic fibrous reinforcing agents such as glass fiber, asbestos fiber, carbon fiber, graphite fiber, metal fiber, potassium titanate whisker, aluminum borate whisker, magnesium whisker, silicon whisker, wollastonite, sepiolite, asbestos, slag fiber, zonolite, ellestadite, plaster fiber, silica fiber, silica.alumina fiber, zirconia fiber, boron nitride fiber, silicon nitride fiber and boron fiber; organic fibrous reinforcing agents such as polyester fiber, nylon fiber, acrylic fiber, regenerated cellulose fiber, acetate fiber, kenaf, ramie, cotton, jute, hemp, sisal, flax, linen, silk, hemp of Manila, sugarcane, wooden pulp, waste paper, used paper and wool; plate-like and granular reinforcing agents such as glass flake, non-swelling mica, graphite, metal foil, ceramic beads, clay, mica, sericite, zeolite, bentonite, dolomite, kaolin, fine powder silicic acid, feldspathic powder, potassium titanate, shirasu balloon, calcium carbonate, magnesium carbonate, barium sulfate, calcium oxide, aluminum oxide, titanium oxide, aluminum silicate, silicon oxide, plaster, novaculite, dawsonite and white clay.

The above reinforcing agents may be coated or sizing-treated by thermoplastic resin such as ethylene/vinyl acetate copolymer and thermosetting resin such as epoxy resin, or may be treated by coupling agents such as amino silane and epoxy silane.

It is preferable that the blending amount of the above reinforcing agents is 0-200 mass parts relative to 100 mass parts of synthetic resin when reinforcing agents are contained in the flame-retardant resin composition of the present invention.

It is preferable that nucleating agents are further added to the flame-retardant resin composition of the present invention. It is preferable to add further the nucleating agents especially when the polactic acid resin is used as synthetic resin. As for the nucleating agent used for the present invention, at least one kind of nucleating agents can be suitably selected from inorganic nucleating agents and organic nucleating agents known in the art as generally available nucleating agents for polymer. It is preferable that the content of nucleating agents is 0.01-30 mass parts relative to 100 mass parts of synthetic resin. 0.05-10 mass parts is more preferable, and the optimal amount is 0.1-5 mass parts.

Specific examples of the above inorganic nucleating agents are metal salts etc. such as kaolinite, synthesized mica, clay, zeolite, silica, graphite, carbon black, magnesium oxide, titanium oxide, calcium sulfide, boron nitride, calcium carbonate, barium sulfate, aluminum oxide, neodymium oxide and phenyl phosphonate. These inorganic nucleating agents may be modified with organic substances in order to improve the dispersibility in the composition.

Specific examples of the above organic nucleating agents are organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanate, calcium octacosanate, sodium stearate, potassium stearate, lithium stearate, calcium stearate, magnesium stearate, barium stearate, sodium montanate, calcium montanate, toluic acid sodium salt, sodium salicylate, potassium salicylate, zinc salicylate, aluminum dibenzoate, sodium β-naphthalate, sodium cyclohexane carboxylate; organic salts of sulfonic acid such as sodium p-toluenesulfonate and sulfoisophthalic acid sodium salt; carboxylic amides such as stearic acid amide, ethylenebis lauric amide, palmitic acid amide, hydroxystearic acid amide, eruic acid amide and tris (t-butyl amide)trimesic acid; benzylidene sorbitol and its derivatives; a metal salt of phosphorus compound such as sodium-2,2'-methylenebis(4,6-di-t-butylphenyl)phosphate and 2,2-methylbis(4,6-di-t-butylphenyl)sodium.

Plasticizers, furthermore, may be added to the flame-retardant resin composition of the present invention. The plasticizers are at least one kind of plasticizers suitably selected from plasticizers known in the art as a generally used for polymer. Examples of the known plasticizers are polyester plasticizers, glycerin plasticizers, multivalent carboxylic acid ester plasticizers, polyalkylene glycol plasticizers and epoxy plasticizers.

Specific examples of the above polyester plasticizer are polyesters comprised of acid components such as adipic acid, sebacic acid, terephthalic acid, isophthalic acid, naphthalenedicarboxylic acid, diphenyldicarboxylic acid and rosin, and diol components such as propylene glycol, 1,3-butanediol, 1,4-butanediol, 1,6-hexanediol, ethylene glycol and diethylene glycol etc.; and polyesters comprised of hydroxycarboxylic acid such as polycaprolactone. These polyesters may be terminated with monofunctional carboxylic acids, monofunctional alcohols or epoxy compounds.

Specific examples of the above glycerin plasticizer are glycerin monoacetomonolaurate, glycerin diacetomonolaurate, glycerin monoacetomonostearate, glycerin diacetomonooleate and glycerin monoacetomonomontanate.

Specific examples of the above multivalent carboxylic acid plasticizer are phthalate esters such as dimethyl phthalate, diethyl phthalate, dibutyl phthalate, dioctyl phthalate, diheptyl phthalate, dibenzyl phthalate and butyl benzyl phthalate; trimellitic esters such as tributyl trimellitate, trioctyl trimellitate and trihexyl trimellitate; adipic acid esters such as diisodecyl adipate, n-octyl-n-decyl adipate, methyl diglycol butyl diglycol adipate, benzyl methyl diglycol adipate and benzyl butyl diglycol adipate; citric acid esters such as acetyl triethyl citrate and acetyl tributyl citrate; an azelaic acid ester such as di-2-ethylhexyl azelate; sebacic acid esters such as dibutyl sebacate and di-2-ethylhexyl sebacate.

Specific examples of the afore-mentioned polyalkylene glycol plasticizer are polyethylene glycol, polypropylene glycol, poly(ethylene oxide.propylene oxide) block copolymer and/or random copolymer; polytetramethylene glycol; polyalkylene glycols such as bisphenol-type ethylene oxide addition polymer, bisphenol-type propylene oxide addition polymer and bisphenol-type tetrahydrofuran addition polymer; or terminal-blocked compounds thereof such as terminal epoxy-modified compound, terminal ester-modified compounds and terminal ether-modified compound.

The afore-mentioned epoxy plasticizer generally indicates epoxy triglyceride etc., which is comprised of epoxy alkyl stearate and soy bean oil. In the present invention, so-called epoxy resins comprised mainly of bisphenol A and epichlorohydrin can also be used.

Specific examples of other plasticizers are benzoic esters of aliphatic polyol such as neopentylglycol dibenzoate, diethylene glycol dibenzoate and triethylene glycol di-2-ethyl butyrate; an aliphatic amide such as stearic acid amide; an aliphatic carboxylic acid ester such as butyl oleate; oxyacid esters such as acetylricinoleic acid methyl ester and acetyl ricinoleic acid butyl ester; pentaerythritol, various types of sorbitol, polyacrylic ester and paraffin type.

It is preferable to stabilize flame-retardant synthetic resin compositions by adding further, if necessary, phenol antioxidant, phosphor antioxidant, thioether antioxidant, ultraviolet absorber and hindered amine light stabilizer etc.

Examples of the above phenol antioxidant are 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-secondary butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzen, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[methyl 3-(3,5-di-tert-butyl-4-hydroxyphenyl)propionate]methane, thiodiethylene glycolbis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl)propionyloxy}ethyl]-2,4,8, 10-tetraoxaspiro[5,5]undecane, triethylene glycolbis[(3-tert-butyl-4-hydroxy-5-methylphenyl) propionate].

It is preferable that the amount of these phenol antioxidants used is 0.001-10 mass parts relative to 100 mass parts of synthetic resin, and 0.05-5 mass parts is more preferable.

Examples of the above phosphor antioxidant are tris-nonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butanetriphosphite, tetrakis(2,4-di-tert-butylphenyl)biphenylenediphosphonite, 9,10-dihydro-9-oxa-10-phosphaphenanthrene-10-oxide, 2,2'-methylenebis(4,6-tert-butylphenyl)-2-ethylhexylphosphite, 2,2'-methylenebis(4,6-tert-butylphenyl)-octadecylphosphite, 2,2'-ethylidenebis(4, 6-di-tert-butylphenyl) fluorophosphite, tris(2-[(2,4,8,10-tetrakis-tert-butyldibenzo[d,f][1,3,2]dioxaphosphepine-6-yl)oxy]ethyl)amine and phosphite of 2-ethyl-2-butylpropyleneglycol and 2,4,6-tri-tert-butylphenol.

It is preferable that the amount of these phosphor antioxidants used is 0.001-10 mass parts relative to 100 mass parts of synthetic resin, and 0.05-5 mass parts is more preferable.

Examples of the above thioether antioxidant are dialkyl thiodipropionates such as dilauryl thiodipropionate, dimyristyl thiodipropionate and distearyl thiodipropionate, and pentaerythritol tetra β-alkyl mercaptopropionic acid) ester. It is preferable that the amount of these thioether antioxidants used is 0.001-10 mass parts relative to 100 mass parts of synthetic resin, and 0.05-5 mass parts is more preferable.

Examples of the above ultraviolet absorber are 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol) and 2-(2'-hydroxy-3'-tert-butyl-5'-carboxyphenyl)benzotriazole; benzoates such as phenyl salicylate, resorcinolmonobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate, methyl-2-cyano-3-methyl-3-(p-methoxyphenyl)acrylate; triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine.

It is preferable that the amount of these ultraviolet absorbers used is 0.001-30 mass parts relative to 100 mass parts of synthetic resin, and 0.05-10 mass parts is more preferable.

Examples of the above hindered amine light stabilizer are hindered amine compounds such as 2,2,6,6-tetramethyl-4-piperidyl stearate, 1,2,2,6,6-pentamethyl-4-piperidyl stearate, 2,2,6,6- tetramethyl-4-piperidyl benzoate, bis(2,2,6,6-tetramethyl-4-piperidyl)sebacate, bis 1,2.2 6.6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)di(tridecyl) -1,2,3,4-butanetetracarboxylate, bis(1,2,2,6,6-pentamethyl-4-piperidyl) di(tridecyl)-1,2,3,4-butanetetracarboxylate, bis(1,2,2,4,4-pentamethyl-4-piperidyl)-2-butyl-2-(3,5-di -tert-butyl-4-hydroxybenzyl)malonate, 1-(2-hydroxyethyl)-2,2,6,6-tetramethyl-4-piperidynol/diethyl succinate condensation product, 1,6-bis(2,2,6,6-tetramethyl-4-piperidylamino) hexarte/2,4-dichloro-6-morpholino-s-triazine condensation product, 1,6-bis(2,2,6,6-tetramethyl-4-piperidylamino)hexane/2,4-dichloro-6-tert-octylamino-s-triazine condensation product, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N -butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyparnino)-s-triazine-6-yl] aminoundecane and 1,6,11-tris[2,4-bis(N-butyl-N-(1,2,2,6,6-pentamethyl-4-piperidyl)amino)-s-triazine-6-yl] aminoundecane. It is preferable that the amount of these hindered amine light stabilizers used is 0.001-30 mass parts relative to 100 mass parts of synthetic resin, and 0.05-10 mass parts is more preferable.

Antistatic agent, metal soap, hydrotalcite, triazine ring-containing compound, metal hydroxide, phosphoric acid ester flame retardant, condensation phosphoric acid ester flame retardant, phosphate flame retardant, inorganic phosphoric flame retardant, silicone flame retardant, other inorganic flame retardant auxiliary agent, other organic flame retardant, filler, pigment, lubricant and foaming agent may be further added to the flame-retardant synthetic resin composition of the present invention if necessary.

Examples of the above triazine ring-containing compound are melamine, ammeline, benzoguanamine, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine and 1,3-hexylenedimelamine etc.

Examples of the above metal hydroxide are magnesium hydroxide, aluminium hydroxide, calcium hydroxide, barium hydroxide, zinc hydroxide and Kisuma 5A (commercial name of magnesium hydroxide: manufactured by Kyowa Chemical Industry Co., Ltd).

Examples of the above phosphoric acid ester flame retardant are trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis-(t-butylphenyl) phenyl phosphate, tris-(t-butylphenyl)phosphate, isopropylphenyldiphenyl phosphate, bis-(isopropylphenyl) diphenylphosphate and tris-(isopropylphenyl)phosphate.

Examples of the above condensation phosphoric acid ester flame retardant are 1,3-phenylene bis(diphenylphosphate), 1,3-phenylene bis(dixylenylphosphate) and bisphenol A bis (diphenylphosphate).

Examples of the above other inorganic flame retardant auxiliary agent are inorganic compounds such as titanium oxide, aluminum oxide, magnesium oxide and hydrotalcite and their surface-treated products. Examples of these inorganic flame retardant auxiliary agent are various types of commercial products such as TIPAQUE R-680 (product name of titanium oxide manufactured by ISHIHARA SANGYO KAISHA, LTD.), Kyowa MAG 150 (product name of magnesium oxide manufactured by Kyowa Chemical Industry Co., Ltd), DHT-4A (product name of hydrotalcite manufactured by Kyowa Chemical Industry Co., Ltd), Alkamiser 4 (product name of zinc modified hydrotalcite manufactured by Kyowa Chemical Industry Co., Ltd).

The example of the above other organic flame retardant auxiliary agent is, for example, pentaerithritol.

The flame-retardant synthetic resin composition of the present invention can further contain additives usually used for synthetic resin such as crosslinking agents, antistatic agents, tarnish inhibitors, plate-out inhibitors, surface treatment agents, plasticizers, lubricants, flame retardants, fluorescent agents, mildewcides, disinfectants, foaming agents, metal deactivators, mold lubricants, pigments, processing materials, antioxidants and light stabilizers, to the extent that they do not interfere with the effects of the present invention.

The flame-retardant synthetic resin composition of the present invention can work to produce various types of mold products by methods such as injection molding, extrusion molding and blow molding. Examples of mold products of the present invention obtained by these molding methods are injection molding products, extrusion molding products, blow molding products, film, fiber and sheet. They can be preferably used as various types of film such as undrawn film, uniaxial drawn film and twin-axial drawn film, as various types of textile such as undrawn filament, drawn filament and superdrawn filament. Particularly they can be preferably used as injection molding products. Furthermore, these mold products can be used for various purposes such as electric-electronic parts, machine parts, optical apparatus, building components, automobile parts and commodities. In particular, they are useful as electric-electronic parts.

The flame-retardant synthetic resin composition and its molded articles of the present invention can be widely used for such industrial fields as electric.electronic.communication, agriculture, forestry and fishery, mining, construction, food, fiber, clothes, medical care, coal, petroleum, rubber, leather, automobile, precision machine, lumber, building material, civil engineering, furniture, print and musical instrument. Specifically, the flame-retardant synthetic resin composition and its molded articles of the present invention can be used for office and stationery supplies and office appliances such as printer, personal computer, word processor, keyboard, PDA (Personal Digital Assistant), telephone machine, copy machine, facsimile machine, ECR (electronic cash register), desktop electronic calculator, electronic pocketbook, card and holder; household electric appliances such as laundry machine, refrigerator, vacuum cleaner, microwave, lighting equipment, game machine, iron and kotatsu; audio and visual equipments such as television, video tape recorder, video camera, radio cassette player, tape recorder, mini disc, CD player, speaker and liquid crystal display; electric-electronic parts and communication devices such as connector, relay, condenser, switch, printed board, coil bobbin, semiconductor sealing material, LED sealing material, electric wire, cable, transformer, deflecting yoke, distribution board and clock.

Furthermore, the flame-retardant synthetic resin composition and its molded articles of the present invention can be widely used for automobile, vehicle, ship, airplane, building, housing and materials for building or civil engineering such as seat (stuffing, outer material or the like), belt, ceiling covering, convertible top, armrest, door trim, rear package tray, carpet, mat, sun visor, wheel cover, mattress cover, air-bag, insulating material, strap, strap belt, wire coating material, electric insulating material, paint, coating material, top layer material, floor material, corner wall material, carpet, wallpaper, wall covering material, armoring material, interior material, roof material, deck material, wall material, pillar material, bottom board, fence material, framing and molding, window and door shape material, shingle board, siding, terrace, balcony, soundproof board, thermal insulating board and window material; living ware and sporting goods such as clothing material, curtain, sheets, plywood, synthetic fiber board, rug, doormat, tarpaulin, bucket, hose, container, glasses, bag, case, snow goggle, ski, racket, tent and musical instrument.

When polylactic acid resin is used as synthetic resin, the flame-retardant synthetic resin composition and its molded articles of the present invention are useful for electric.electronic parts such as housing of electric equipment, housing of OA equipment, various types of cover, various types of gear, various types of case, sensor, LED lamp, connector, socket, resistor, relay case, switch, coil bobbin, condenser, variable condenser case, light pickup, resonator, various types of terminal board, transformer, breaker, plug, printed circuit board, tuner, speaker, microphone, headphone, compact motor, magnetic head base, power module, housing, semiconductor, liquid crystal, FDD carriage, FDD chassis, motor brush holder, parabola antenna, CD tray, cartridge, cassette, sorter, AC adapter, battery board, switch board, outlet cover, VTR parts, TV parts, iron, hair drier, rice cooker parts, microwave parts, audio parts, audio.laser disc compact disc, lighting parts, refrigerator parts, air conditioner parts, typewriter parts, word processor parts, office computer associated parts, telephone associated parts, facsimile associated parts and copy machine associated parts.

Useful examples of the flame-retardant synthetic resin composition and its molded articles of the present invention for machine parts are cleaning equipment, various types of roller bearings such as an oil-less roller bearing, a stern roller bearing and an underwater roller bearing; motor parts, lighters and typewriters. Examples of optical equipment are microscopes, binoculars, cameras and clocks.

Useful examples of the flame-retardant synthetic resin composition and its molded articles of the present invention for automobile parts are various types of valves such as precision machine associated parts, an alternator terminal, an alternator connector, an IC regulator and an emission valve. Other examples are various types of pipes of a fuel associated pipe, an outlet and inlet pipes, an air-intake nozzle snorkel, an intake manifold, a fuel pump, an engine cooling water joint, a carburetor main body, a carburetor spacer, an emission sensor, a cooling water sensor, an oil temperature sensor, a brake pad wear sensor, a throttle position sensor, a crank shaft position sensor, an air flow meter, a thermostat base for air-conditioner, a hot-air heating flow control valve, a brush holder for radiator motor, a water pump impeller, a turbine vane, wiper motor associated parts, a distributor, a starter switch, a starter relay, a wire harness for transmission, a window washer nozzle, an air-conditioner panel switch substrate, a coil for fuel-associated electromagnetic valve, a connector for fuse, a horn terminal, an electric insulating plate, a step motor rotor, a lamp socket, a lamp reflector, a lamp housing, a brake piston, a solenoid bobbin, an engine oil filter and an ignition case.

The invention will now be described referring to specific examples, but the invention is not limited to these. The composition shown in. Tables 1 and 2 is based on mass part.

Examples 1-12 and Comparative Examples 1 and 2

After mixing the polypropylene resin compositions which were obtained by adding 0.1 mass parts of calcium stearate (lubricant), 0.1 mass parts of tetrakis[3-(3,5-di-tert-butyl-4-hydroxyphenyl)methylpropionate]methane (phenol antioxidant) and 0.1 mass parts of tris(2,4-di-tert-butylphenyl)phosphite (phosphor antioxidant) to 70 mass parts of polypropylene (Mitsui Chemicals, Inc.: Injection molding grade), with components described in the following Table 1, the obtained mixtures were extruded at 200-230° C. to prepare pellets. Each obtained pellet was injection molded at 200° C. to obtain the test piece of 1.6 mm thick.

Components (A) and (B) described in Table 1 were prepared by the following methods.

Manufacturing Example 1

Component (A): Melamine Pyrophosphate

Pyrophosphoric acid and melamine of mole ratio 1:1, were reacted to prepare component (A).

Manufacturing Example 2

Component (B): Piperazine Pyrophosphate

Pyrophosphoric acid and piperazine of mole ratio 1:1 were reacted to prepare component (B).

<Flame Retardancy UL-94V Test>

The test piece of 127 mm long, 12.7 mm wide and 1.6 mm thick was kept vertical lengthwise, then a fire of burner was brought to a bottom end of the test piece closely for 10 seconds and the burner was taken away. The length of time until the fire of the test piece went out was measured. As soon as the fire went out, the fire of burner was again brought to the bottom end of the test piece closely for 10 seconds. The length of time until the fire of the test piece went out was measured in the same way as the first time. In addition, it was evaluated whether the cotton under the test piece began to burn due to the dropping of live charcoal on it or not.

From the viewpoints of how long the test piece kept burning and whether the cotton began to burn or not in the first and second tests, the burning-rank was set according to UL-94V standard. V-0 of the burning level was the best. As the burning levels get lower like V-1, V-2, a flame retardancy decreases. The case that does not correspond to any rank of V-0~V-2 was NR.

<Evaluation of Anti-Dripping Property>

It was identified whether the cotton caught fire due to the dripped live charcoal from the test piece or not in the above tests carried out according to the flame retardancy UL-94V test. By monitoring how many times the cotton caught fire due to the dripping during 10 tests, flame retardancy was evaluated.

TABLE 1

| Composition | | Example | | | | | | | | | | | | Comparative Example | |
|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 |
| Polypropylene resin composition | | 70 | 70 | 70 | 70 | 70 | 70 | 70 | 70 | 70 | 78 | 60 | 60 | 70 | 70 |
| Component (A) melamine pyrophosphate | | 12 | 12 | 12 | 11.4 | 12 | 12 | 12 | 12 | 11.4 | 10 | 16 | 15.4 | 12 | 11.4 |
| Component (B) piperazine pyrophosphate | | 18 | 18 | 18 | 17.1 | 18 | 18 | 18 | 18 | 17.1 | 15 | 24 | 23.1 | 18 | 17.1 |
| Component (C) | montmorilbonite | 1 | 3 | 5 | 3 | | | | | | | | | | |
| | talc | | | | | 1 | 3 | 5 | 8 | 5 | 1 | 1 | 1 | | |
| Component (D) Zinc oxide | | | | | 1.5 | | | | | 1.5 | 3 | | 1.5 | | 1.5 |
| UL-94V (1.6 mm) | | V-0 | V-0 | V-0 | V-0 | V-0 | V-0 | V-0 | V-0 | V-0 | V-0 | V-0 | V-0 | V-2 | V-2 |
| Number of cotton ignition | | 0 | 0 | 0 | 0 | 0 | 0 | 0 | 0 | 0 | 0 | 0 | 0 | 4 times | 4 times |

Examples 1-12 achieved the burning level of V-0 in the UL-94V test and the anti-dripping properties were recognized. On the other hand, in the case of comparative examples 1 and 2 wherein the component (C) was not contained, the ignition of cotton by dripping was observed, and the level V-0 in the UL-94 test was not achieved, which proved that the flame retardancy was insufficient in comparative examples 1 and 2.

Examples 13-25 and Comparative Examples 3-7

The polylactic acid resin composition which was obtained by mixing 0.1 mass parts of calcium stearate (lubricant), 0.1 mass parts of tetrakis[3-(3,5-di-tert-butyl-4-hydroxyphenyl)methylpropionate]methane(phenol antioxidant) and 0.1 mass parts of tris(2,4-di-tert-butylphenyl)phosphite (phosphor antioxidant) with 80 mass parts of polylactic acid (commercial name: TERRAMAC 1030 manufactured by UNITIKA. LTD.), was mixed with the components described in the following Table 2. Then the obtained mixtures were extruded at 210° C. to prepare pellets. Each pellet obtained was injection molded at 210° C. to prepare the test piece of 1.0 mm thick %

Components (A) and (B) described in Table 2 were prepared in the same way as each component used in Table 1.

<Flame Retardancy UL-94V Test>

The evaluation was carried out in the same way as Table 1 except that a test piece of 127 mm long, 12.7 mm wide and 1.0 mm thick was used.

<Evaluation of Drip Inhibiting Property>

It was identified whether the cotton caught fire, due to the dripped live charcoal from the test piece, or not in the above tests carried out according to the flame retardancy UL-94V test. By monitoring how many times the cotton caught fire due to the dripping during 10 tests, flame retardancy was evaluated.

erties and flame retardancy, but also causes no poisonous gas when burned. Therefore, it is useful for molded resin products such as building materials, automobile parts, wrapping materials, agricultural materials, housing materials for home electric appliances, and toys.

What is claimed is:

1. A flame-retardant synthetic resin composition, containing no halogen compound and comprising components (A), (B) and (C) together with a synthetic resin selected from the following synthetic resins: α-olefin polymers or copolymers thereof; petroleum resin; coumarone resin; polystyrene; polyvinyl acetate; acrylic resin; copolymers of styrene and/or α-methylstyrene with other monomers; polyamides; thermoplastic polycarbonate, polycarbonate/ABS resin, branched polycarbonate, polyacetal, polyphenylene sulfide, polyurethane or cellulose resins; isoprene rubber, butadiene rubber, acrylonitrile-butadiene copolymer rubber or styrene-butadiene copolymer rubber elastomers; or mixtures thereof;

Component (A): (poly)phosphate compound represented by the following formula (1)
Component (B): (poly)phosphate compound represented by the following formula (3)
Component (C): layered silicate in an amount effective to achieve an anti-dripping effect

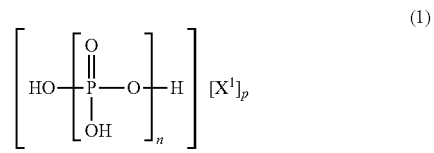

(1)

TABLE 2

| Composition | Example | | | | | | | | | | | | | Comparative Example | | | | |
|---|---|---|---|---|---|---|---|---|---|---|---|---|---|---|---|---|---|---|
| | 13 | 14 | 15 | 16 | 17 | 18 | 19 | 20 | 21 | 22 | 23 | 24 | 25 | 3 | 4 | 5 | 6 | 7 |
| polylactic acid resin composition | 80 | 80 | 80 | 80 | 80 | 80 | 80 | 80 | 85 | 70 | 70 | 60 | 60 | 80 | 80 | 80 | 80 | 80 |
| Component (A) Melamine pyrophosphate | 8 | 8 | 8 | 8 | 8 | 10 | 12 | 8 | 6 | 12 | 12 | 16 | 16 | 20 | | 20 | | 8 |
| Component (B) Piperazine pyrophosphate | 12 | 12 | 12 | 12 | 12 | 10 | 8 | 12 | 9 | 18 | 18 | 24 | 24 | | 20 | | 20 | |
| Component (C) Talc[X1] | 0.5 | 1 | 0.5 | 1 | 3 | 1 | 1 | 1 | 3 | 1 | 1 | 1 | 1 | 1 | 1 | 1 | 1 | 1 |
| Component (D) Zinc oxide | | | 1 | 1 | 1 | 1 | 1 | 1 | 1 | | 1 | | 1 | | | 1 | 1 | 1 |
| Component (E) Polycarbodiimide[X2] | | | | | | | | | 1 | | | | | | | | | |
| Ammonium polyphosphate[X3] | | | | | | | | | | | | | | | | | | 12 |
| UL-94V (1.0 mm) | V-0 | V-0 | V-0 | V-0 | V-0 | V-0 | V-0 | V-0 | V-0 | V-0 | V-0 | V-0 | V-0 | V-2 | V-2 | V-2 | V-2 | NR |
| Number of dripping | 8 | 5 | 0 | 0 | 0 | 4 | 7 | 0 | 10 | 0 | 0 | 0 | 0 | 10 | 10 | 10 | 10 | 10 |
| Number of cotton ignition | 0 | 0 | 0 | 0 | 0 | 0 | 0 | 0 | 0 | 0 | 0 | 0 | 0 | 3 | 10 | 4 | 10 | 10 |

[X1]MICRO ACE P-4 (Commercial name of talc, manufactured by NIPPON TALC CO., LTD.)
[X2]CARBODLITE LA-1 (Commercial name of polycarbodiimide manufactured by Nisshinbo Chemical Inc.)
[X3]Exolit AP-750 (Commercial name of ammonium polyphosphate compound manufactured by Clariant CO., LTD.)

As is clear from Table 2, it was proved that the composition of the present invention has excellent flame retardancy.

Industrial Applicability

The flame-retardant synthetic resin composition of the present invention has not only excellent anti-dripping propwherein n in the formula (1) represents a number of 1-100, $X^1$ is ammonia or a triazine derivative represented by the following formula (2) and p is a number satisfying the relational expression of $0 < p \leq n+2$;

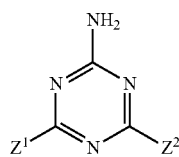

wherein $Z^1$ and $Z^2$ in the formula (2) are groups selected independently from a —$NR^5R^6$ group, a hydroxyl group, a mercapto group, a straight chain or branched alkyl group having 1-10 carbon atoms, a straight chain or branched alkoxy group having 1-10 carbon atoms, a phenyl group and a vinyl group, and $R^5$ and $R^6$ are selected independently from a hydrogen atom, a straight chain or branched alkyl group having 1-6 carbon atoms, or a methylol group;

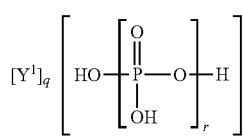

wherein r in the formula (3) represents a number of 1-100, $Y^1$ is a diamine containing a [$R^1R^2N(CH_2)_mNR^3R^4$] group, piperazine or a diamine containing a piperazine ring, $R^1$, $R^2$, $R^3$ and $R^4$ are independently selected from a hydrogen atom, or a straight chain or branched alkyl group having 1-5 carbon atoms, m is an integer of 1-10, and q is a number satisfying the relational expression of $0<q<r+2$;

wherein the content of said components (A)-(C), respectively, are 0.1-40 mass parts, 0.1-50 mass parts, and 0.01-15 mass parts relative to 100 mass parts of said synthetic resin;

wherein the blending ratio (A)/(B) (mass standard) of said components (A) and (B) is 20/80-50/50; and wherin the flame-retardant synthic resin composition does not contain polylactic acid.

2. The flame-retardant synthetic resin composition described in claim 1, further comprising 0.01-10 mass parts of zinc oxide per 100 mass parts of synthetic resin as a component (D).

3. The non-halogen flame-retardant synthetic resin composition described in claim 1, wherein n is 2, p is 2 and $X^1$ is melamine in the above formula (1) as the above component (A), and $Z^1$ and $Z^2$ in the above formula (2) contains melamine pyrophosphate of —$NH_2$.

4. The flame-retardant synthetic resin composition described in claim 1, wherein piperazine polyphosphate is contained as said component (B), which corresponds to the compound represented by the formula (3), wherein q is 1 and $Y^1$ is piperazine.

5. The flame-retardant synthetic resin composition described in claim 4, wherein said piperazine polyphosphate is a piperazine pyrophosphate.

6. The non-halogen flame-retardant synthetic resin composition described in claim 1, wherein the said component (C) is a saponite and/or talc.

7. A molded article comprising the flame-retardant synthetic resin composition described in claim 1.

8. The flame-retardant synthetic resin composition described in claim 1, wherein the synthetic resin is selected from the following synthetic resins: polypropylene; high density polyethylene; low density polyethylene; straight chain low density polyethylene; polybutene; poly-3-methylpentene; petroleum resin;

coumarone resin; polystyrene; polyvinyl acetate; acrylic resin; ethylene-vinyl acetate copolymers; ethylene-propylene copolymers; copolymers of styrene and/or α-methylstyrene with maleic anhydride, phenyl maleimide, methyl methacrylate, butadiene and/or acrylonitrile; polyphenylene oxide; polycaprolactam; polyhexamethylene adipamide; isoprene rubber, butadiene rubber, acrylonitrile-butadiene copolymer rubber or styrene-butadiene copolymer rubber elastomers; or mixtures thereof.

9. The flame-retardant synthetic resin composition according to claim 1, which does not contain silicone oil.

10. The flame-retardant synthetic resin composition according to claim 1, which contains component (C) in an amount of 12-15 mass parts relative to 100 mass parts of said synthetic resin.

11. The flame-retardant synthetic resin composition according to claim 1, which contains melamine pyrophosphate, piperazine pyrophosphate and talc.

12. The flame-retardant synthetic resin composition according to claim 1, which contains melamine pyrophosphate, piperazine pyrophosphate and montmorillonite.

* * * * *

UNITED STATES PATENT AND TRADEMARK OFFICE
CERTIFICATE OF CORRECTION

| | |
|---|---|
| PATENT NO. | : 8,324,296 B2 |
| APPLICATION NO. | : 12/999190 |
| DATED | : December 4, 2012 |
| INVENTOR(S) | : Kaneda et al. |

It is certified that error appears in the above-identified patent and that said Letters Patent is hereby corrected as shown below:

Column 27, Line 35 reads: "relational expression of $0<q<r+2$;" should read --relational expression of $0<q\leq r+2$;--.

Column 27, Line 42 reads: "wherin the flame-retardant synthic resin composition" should read --wherein the flame-retardant synthetic--.

Signed and Sealed this
Twelfth Day of February, 2013

Teresa Stanek Rea
*Acting Director of the United States Patent and Trademark Office*